(12) United States Patent
Svevar et al.

(10) Patent No.: US 10,432,691 B2
(45) Date of Patent: Oct. 1, 2019

(54) METHODS AND NODES FOR TRANSMISSION OF A SYNCHRONOUS DATA OVER PACKET DATA NETWORK

(71) Applicant: TRANSMODE SYSTEMS AB, Stockholm (SE)

(72) Inventors: Magnus Svevar, Järfälla (SE); Håkan Nivestedt, Sollentuna (SE); Jens Rasmussen, Tyresö (SE)

(73) Assignee: Transmode Systems AB, Stockholm (SE)

( * ) Notice: Subject to any disclaimer, the term of this patent is extended or adjusted under 35 U.S.C. 154(b) by 71 days.

(21) Appl. No.: 15/287,905

(22) Filed: Oct. 7, 2016

(65) Prior Publication Data
US 2017/0026446 A1 Jan. 26, 2017

Related U.S. Application Data

(63) Continuation of application No. PCT/SE2015/050413, filed on Apr. 7, 2015.

(30) Foreign Application Priority Data

Apr. 9, 2014 (SE) ...................... 1450439

(51) Int. Cl.
*H04L 29/06* (2006.01)
*H04J 3/06* (2006.01)
(Continued)

(52) U.S. Cl.
CPC .......... *H04L 65/607* (2013.01); *H04J 3/0632* (2013.01); *H04L 7/0079* (2013.01);
(Continued)

(58) Field of Classification Search
CPC ......... H01L 12/64; H01L 12/841; H01L 7/00; H01L 29/06
See application file for complete search history.

(56) References Cited

U.S. PATENT DOCUMENTS

| | | |
|---|---|---|
| 5,267,263 A | 11/1993 | Feezel et al. |
| 5,396,492 A | 3/1995 | Lien |

(Continued)

FOREIGN PATENT DOCUMENTS

DE 199 19 691 A1 11/2000

*Primary Examiner* — Anez C Ebrahim
(74) *Attorney, Agent, or Firm* — Bergenstråhle & Partners

(57) ABSTRACT

Methods, system, nodes and computer program for transmission of a synchronous data stream having a bitrate, over an asynchronous packet data network between a transmitter node and a receiver node comprising: packaging, by the transmitter node, the synchronous data stream into data packets, transmitting, by the transmitter node, the data packets onto the asynchronous packet data network with a fixed packet rate defined by a first clock frequency which corresponds to the average distance in time between two consecutive data packets transmitted onto the asynchronous packet data network, which is independent of the bitrate of the synchronous data stream, receiving, by the receiver node, the data packets from the asynchronous packet data network detecting, by the receiver node, the fixed packet rate, and based on the fixed packet rate, regenerating, by the receiver node, the first clock frequency by detection of the distance in time between two consecutive data packets received from the asynchronous packet data network.

11 Claims, 8 Drawing Sheets

(51) Int. Cl.
*H04L 12/841* (2013.01)
*H04L 7/00* (2006.01)
*H04L 12/64* (2006.01)

(52) U.S. Cl.
CPC ........ *H04L 7/0091* (2013.01); *H04L 12/6418* (2013.01); *H04L 47/28* (2013.01)

(56) References Cited

U.S. PATENT DOCUMENTS

| | | | |
|---|---|---|---|
| 6,963,561 | B1 | 11/2005 | Lahat |
| 2003/0211837 | A1* | 11/2003 | Kitatani ................. G01S 19/235 455/192.1 |
| 2006/0202771 | A1* | 9/2006 | Seki ........................ G04C 13/00 331/158 |
| 2008/0056190 | A1* | 3/2008 | Kim .................. H04W 36/0077 370/331 |
| 2011/0311011 | A1 | 12/2011 | Zhang et al. |
| 2013/0309971 | A1* | 11/2013 | Kiukkonen ........... H04L 63/107 455/41.2 |

* cited by examiner

METHODS AND NODES FOR TRANSMISSION OF A SYNCHRONOUS DATA OVER PACKET DATA NETWORK

This application is the continuation of International Application No. PCT/SE2015/050413, filed 7 Apr. 2015, which claims the benefit of Swedish Patent Application No. SE 1450439-3, filed 9 Apr. 2014, the entire contents of which are hereby incorporated by reference.

TECHNICAL FIELD

The present disclosure relates generally to methods, nodes and computer programs of a communications network for transmission of a synchronous data stream having a bitrate over an asynchronous packet data network between a transmitter node and a receiver node.

BACKGROUND

A common way to build and operate communications networks are by usage of synchronous connections between nodes in a network for transmission of synchronous data streams that can stay synchronous over the whole network. This way of building networks has been used since many years. Yet the speed of the connections has generally increased over time, as well as the various techniques used. The connections are carried by different kind of physical medias, such as both wired solutions based on copper or similar material and optical links, as well as wireless links. Above the physical carrier, various signaling methods and protocols may be used to convey data synchronously.

Synchronous data streams over a network may be carried by SDH (Synchronous Digital Hierarchy), SONET (Synchronous Optical Networking), are a couple of non-limiting examples of technologies for synchronously carrying of data. The synchronous data stream has a bitrate determined by a clock frequency.

From the introduction of digital communication the possible bandwidth increase has so far indicated to be almost infinite, enabling different services for telecommunications, data communications and related services carried by those types of networks. The synchronous connections may meet the required need of bandwidth, quality and distance. However, the synchronicity, which is a feature for synchronous connecting between nodes in a network for transmission of a synchronous data stream, sometimes has drawbacks.

One drawback though may be to just maintain the synchronicity throughout a communications network. Another challenge may be in the interconnection of equipment from different vendors, another challenge may be in the transition between different connections, where the transition may for example include transition in speed or bandwidth. Another challenge may be in intersections between pluralities of connections, just to mention some examples of different challenges.

A trend since some time back is to build communications networks as packet data networks, or asynchronous data networks. Packet data networks may be based on synchronous communication links. Alternatively, packet data networks may be operated as packet data links directly over fiber, such as Ethernet or TCP/IP (Transmission Control Protocol/Internet Protocol). Packet data networks may be built both on synchronous as well as asynchronous links. The synchronicity characteristic is normally maintained over a synchronous network, but may be lost over an asynchronous network. Communications networks based on packet data networks may be as complex to build and operate as synchronous networks, but networks based on synchronous communication in larger scale tend to be more complex to build and operate. It seems further that interoperability issues are better handled in the packet data domain.

In practice different network techniques are used, both for historical reasons, as well as that each individual solution may have its strengths and benefits. It may be further unpractical to rebuild or replace communication infrastructure built over many years. A problem is therefore to handle the transition between different networks, such as synchronous networks and asynchronous networks. Another problem is connecting synchronous networks over asynchronous networks together. Another problem is to take advantage of packet data networks, without losing the benefits of a transmission of a synchronous data stream.

SUMMARY

It is an object of the invention to address at least some of the problems and issues outlined above. It is possible to achieve these objects and others by using a method and an apparatus as defined in the attached independent claims.

According to one aspect, a method performed by a system of a communications network is provided for transmission of a synchronous data stream having a bitrate, over an asynchronous packet data network between a transmitter node and a receiver node. The method comprises packaging, by the transmitter node, the synchronous data stream into data packets, The method comprises transmitting, by the transmitter node, the data packets onto the asynchronous packet data network with a fixed packet rate defined by a first clock frequency which corresponds to the average distance in time between two consecutive data packets transmitted onto the asynchronous packet data network, which is independent of the bitrate of the synchronous data stream. The method comprises receiving, by the receiver node, the data packets from the asynchronous packet data network. The method comprises detecting, by the receiver node, the fixed packet rate. The method comprises, based on the fixed packet rate, regenerating, by the receiver node, the first clock frequency by detection of the distance in time between two consecutive data packets received from the asynchronous packet data network.

An advantage with the solution is that it may be possible to transmit synchronous data over an asynchronous network, without having synchronized clocks on both transmitter and receiver side.

According to another aspect, a method performed by a transmitter node of a communications network is provided, for transmission of a synchronous data stream having a bitrate over an asynchronous packet data network to a receiver node. The method comprises packaging the synchronous data stream into data packets. The method comprises transmitting the data packets onto the asynchronous packet data network with a fixed packet rate defined by a first clock frequency which corresponds to the average distance in time between two consecutive data packets transmitted onto the asynchronous packet data network, which is independent of the bitrate of the synchronous data stream.

According to another aspect, a method performed by a receiver node of a communications network is provided, for reception of a synchronous data stream having a bitrate over an asynchronous packet data network from a transmitting node, comprising. The method comprises receiving data packets from the packet data network. The method comprises detecting a fixed packet rate. The method comprises based on the fixed rate, regenerating a first clock frequency by detection of the distance in time between two consecutive data packets received from the asynchronous packet data network.

Circuit Emulation Services (CES) like for instance Differential Timing has previously been implemented over Synchronous Ethernet networks. Solutions around CES is described in the publication "J. Aweya, "Emerging Applications of Synchronous Ethernet in Telecommunication Networks," IEEE Circuits and Systems Magazine, pp. 56-72, Volume 12, Number 2, Second quarter 2012." and U.S. Pat. No. 7,492,732 (B2).

An advantage with the solution described in this document, may be that although it might be used over a synchronous network like Synchronous Ethernet, it may also be used with good performance over an asynchronous network like ordinary Ethernet. The Differential Timing technology is intended for synchronous networks, which however does not need to be in the same synchronization domain as the synchronous protocols sent over the network.

An advantage of the solution in relation to other types of CES technology, may be that the packet rate is constant and independent of the bitrates of the protocols to be transported. It may be easier to regenerate a frequency which is known and fixed, compared to regenerate a frequency which can change at any time, which is the general case for other CES implementations where the packet rate follows the bitrate of the transported protocol. Sudden frequency drifts can be caused when signals go into or out from holdover conditions.

An advantage may be that the fixed clock frequencies may be different in different nodes as no central atomic clocks controls these fixed clock frequencies. When implementing CES solutions, all the synchronous protocols e.g. in a whole country, might be controlled by a central atomic clock; this means that for the same type of protocol, like for instance STM-1, the packet rates will be the same over the whole country and this might cause traffic congestions in the network which might last for very long times.

According to another aspect, a system of a communications network is provided, for transmission of a synchronous data stream having a bitrate over an asynchronous packet data network between a transmitter node and a receiver node. The system comprises the transmitter node arranged to package the synchronous data stream into data packets. The system comprises the transmitter node arranged to transmit the data packets onto the asynchronous packet data network with a fixed packet rate defined by a first clock frequency which corresponds to the average distance in time between two consecutive data packets transmitted onto the asynchronous packet data network, which is independent of the bitrate of the synchronous data stream. The system comprises the receiver node arranged to receive the data packets from the asynchronous packet data network, The system comprises the receiver node arranged to detect the fixed packet rate. The system comprises based on the fixed packet rate, the receiver node arranged to regenerate the first clock frequency by detection of the distance in time between two consecutive data packets received from the asynchronous packet data network. The system comprises the receiver node arranged to read data with a second clock frequency, which second clock frequency is adapted such that the amount of data stacked at the receiving node is more or less constant.

According to another aspect, a transmitter node of a communications network is provided, for transmission of a synchronous data stream having a bitrate over an asynchronous packet data network to a receiver node. The transmitter node is arranged to package the synchronous data stream into data packets. The transmitter node is arranged to transmit the data packets onto the asynchronous packet data network with a fixed packet rate defined by a first clock frequency which corresponds to the average distance in time between two consecutive data packets transmitted onto the asynchronous packet data network, which is independent of the bitrate of the synchronous data stream.

According to another aspect, a receiver node of a communications network is provided, for reception of a synchronous data stream having a bitrate over an asynchronous packet data network from a transmitting node. The receiver node is arranged to receive data packets from the packet data network. The receiver node is arranged to detect a fixed packet rate. The receiver node is arranged to, based on the fixed rate arranged to regenerate a first clock frequency by detection of the distance in time between two consecutive data packets received from the asynchronous packet data network. The receiver node is arranged to read data with a second clock frequency, which second clock frequency is adapted such that the amount of data stacked at the receiving node is more or less constant.

According to another aspect, a computer program comprising computer readable code which, when run on a transmitter node, causes the transmitter node to behave as a transmitter node described by this disclosure.

According to another aspect, a computer program comprising computer readable code which, when run on a receiver node, causes the receiver node to behave as a receiver node described by this disclosure The above method, system, nodes and computer program may be configured and implemented according to different optional embodiments. In one possible embodiment, the first clock frequency of the bitrate based on the time period between a predetermined point of each asynchronous data packet may be determined. In one possible embodiment, the first clock frequency may be a reference clock frequency of the receiver node. In one possible embodiment, the second clock frequency may be a bitrate of an individual synchronous communications unit. In one possible embodiment, the fixed time period may be controlled by a clock oscillator of type crystal oscillator, or atomic clock. In one possible embodiment, the time period may be determined based on data packets with a short transmission time when the transmission time vary.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to transmit synchronous data over an asynchronous network. Note that with the term "asynchronous network" it is included a network that is not synchronized to the synchronous data that is to be transmitted over the network. It may therefore be possible, but not the most common embodiment, that the "asynchronous network" might be internally synchronized to one or more unknown clocks. The transmission of the synchronous data over the asynchronous network is performed without transmission of additional clock synchronization information. The solution utilizes transmission of a synchronous data stream with a data stream over an asynchronous packet data network by sending the data packets at a fixed packet rate from a transmitter node. The fixed packet rate may be completely independent of rate of the synchronous data stream. The fixed packet rate may indicate a reference clock frequency or a transmitter node line clock frequency. A receiver node may be enabled to detect the fixed packet rate. By detecting the fixed packet rate, the receiver node may be enabled to recreate the reference clock frequency and the synchronous data stream. The reference clock frequency may correspond to a clock frequency of the transmitted packet rate. Thereby it is possible to convey a synchronous data stream from a transmitter node over an asynchronous packet data network to a receiver node and recreate the synchronous data stream at a receiver side. The term "fixed packet rate" may correspond to a long time average packet rate, where it may be differences in a momentary rate.

Figure 1:
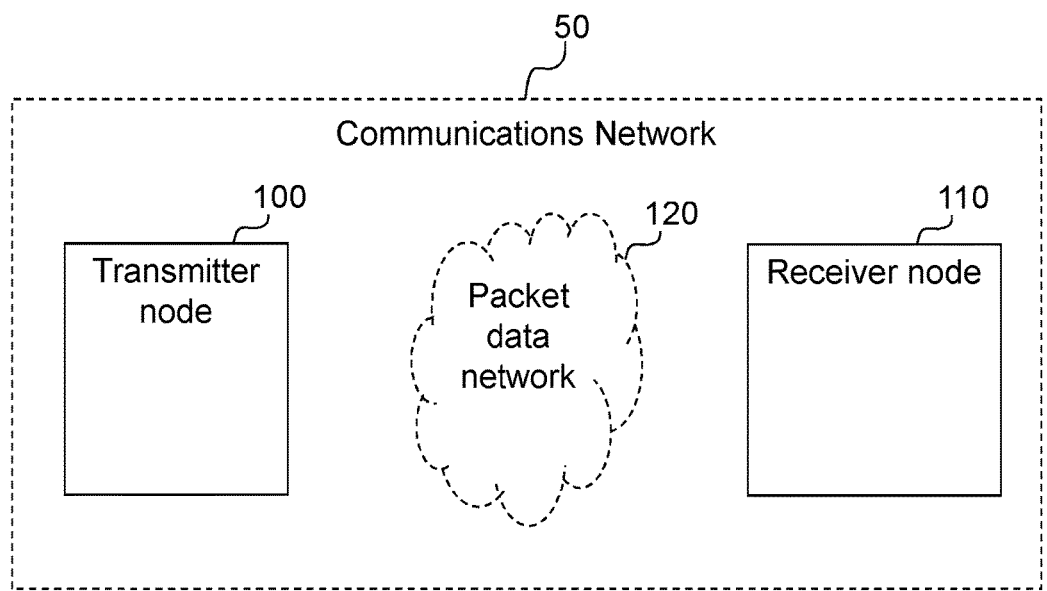
FIG. 1 is a block diagram illustrating, according to some possible embodiments.

Now the solution will be described in more detail. FIG. 1 illustrates an overview of the solution. A communications network 50 with a transmitter node 100 connected to a receiver node 110, via a packet data network 120.

Figure 2:
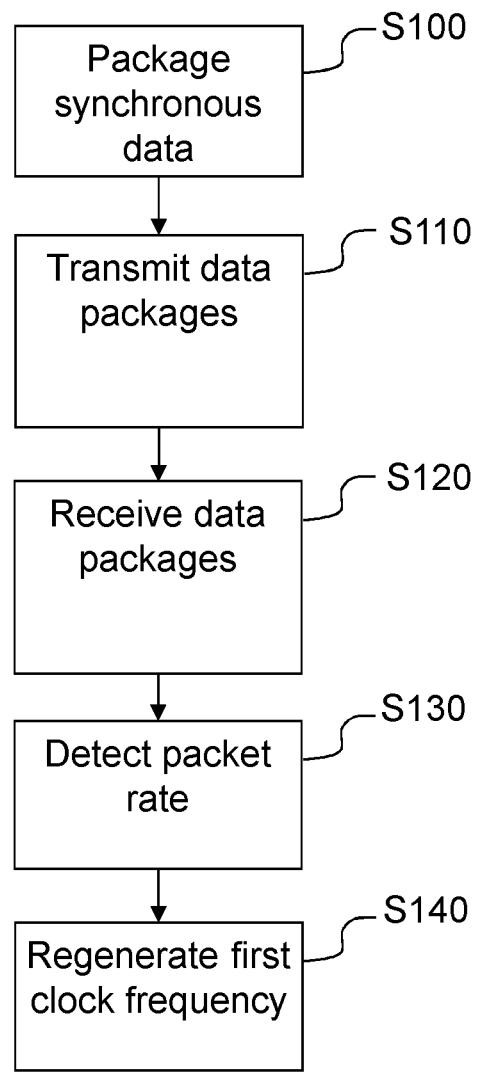
FIG. 2 is a flow chart illustrating a procedure in a system, according to possible embodiments.

FIG. 2 illustrates a flowchart of an embodiment of the solution. A method performed by a system of a communications network 50 for transmission of a synchronous data stream having a bitrate, over an asynchronous packet data network 120 between a transmitter node 100 and a receiver node 110. The method comprises in a step S100 packaging the synchronous data stream into data packets by the transmitter node 100. In a step S110 transmitting, by the transmitter node, the data packets onto the asynchronous packet data network 120 with a fixed packet rate defined by a first clock frequency which corresponds to the average distance in time between two consecutive data packets transmitted onto the asynchronous packet data network, which is independent of the bitrate of the synchronous data stream. In a step S120 receiving the data packets from the asynchronous packet data network 120 by the receiver node 110. In a step S130 detecting S130, by the receiver node 110, the fixed packet rate. Based on the fixed packet rate, in a step S140 regenerating, by the receiver node 110, the first clock frequency by detection of the distance in time between two consecutive data packets received from the asynchronous packet data network.

The term "asynchronous packet data network" may include any kind of packet data network that might be asynchronous relative the synchronous data stream, i.e. both a packet data stream over a packet data network, as well as synchronous data stream over a synchronous data network with an unknown clock frequency.

The term first clock frequency may also be termed, or correspond to "reference clock" or "reference clock frequency", "internal clock frequency", "host clock frequency", "packet transmission rate clock frequency", "send clock", send clock frequency" or similar terms. The term second clock frequency may also be termed, or correspond to "synchronous data stream clock frequency", "client interface clock frequency", "client clock frequency", "client bitrate" or similar terms.

Sometimes it may be needed or advantageous to transmit synchronous data streams over asynchronous communications networks, such as packet data networks. However, when the synchronous data stream goes into the asynchronous communications networks, the synchronism may be lost. The packet data network 120 conveys data packets, which may go different ways through the network and may be delayed along the way due to congestion. The data packet does normally reach its destination, and the data is restored in order by the protocol carrying the data packets, but any clock information related to an original bitrate is lost in the packet data network 120 without relay of clock information through some way.

The solution proposes that a synchronous data stream should be packaged in data packets by a transmitter node 100. The transmitter node 100 may be a small conversion unit, translating a synchronous data stream into data packets. The transmitter node 100 may be a junction point with several interfaces for synchronous communication and several interfaces for packet communication. The data packets may be transmitted from the transmitter node 100 onto the packet data network 120, with a fixed packet rate. The fixed packet rate is independent of the synchronous bitrate, i.e. there is no relation between the data packet rate and the bitrate.

The packet data network 120 may be an Ethernet based network, a TCP/IP (Transfer Control Protocol/Internet Protocol) based network or other kind of packet data networks. The packet data network 120 may be just one or a couple of hops. The packet data network 120 may be a large scale network where a number of switches or routers may be passed between a transmitter node 100 and a receiver node 110. Examples of a large scale packet data network 120 may be an operator's backhaul network, back bone network, or the Internet. The receiver node 110 which receives the data packets, detects the rate of the received data packets. Based on the detected rate of the received data packets, the data packet rate is used for regeneration of the synchronous data stream packaged in the data packages. The regeneration may be carried out by detection of the data packet rate, and based on the rate regenerate a first clock frequency, which may be the clock frequency with which the data packet was transmitted.

In an embodiment, the solution may comprise reading data received at the receiver node 110 with a second clock frequency, which second clock frequency is adapted such that the amount of data stacked at the receiving node is more or less constant.

In an embodiment, the solution may comprise adding a time stamp to a portion of the data packets, or to all data packets, at the transmitter node 100. The added time stamp may indicate a clock frequency of a synchronous communication unit 150, further described below. The receiver node 110 may read the time stamps. The receiver node 110 may be reading the time stamps determine and regenerate the second clock frequency. The time stamp may be used to adjust the second clock frequency. The receiver node 110 may use the time stamp together with a determined offset.

Figure 3:
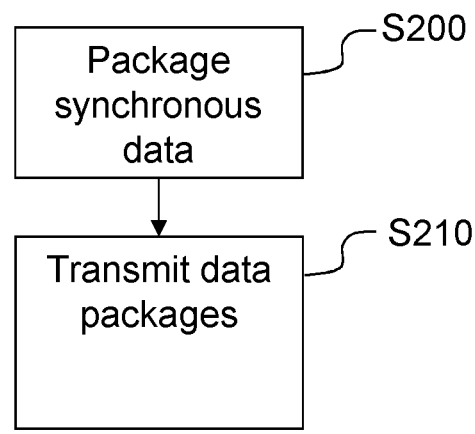
FIG. 3 is a flow chart illustrating a procedure in a transmitter node, according to possible embodiments.

FIG. 3 illustrates an embodiment of a method performed by a transmitter node 100 of a communications network 50 for transmission of a synchronous data stream having a bitrate over an asynchronous packet data network 120 to a receiver node 110. The method comprises packaging, in a step S200, the synchronous data stream into data packets. The method comprises transmitting, in a step S210 transmitting the data packets onto the asynchronous packet data network 120 with a fixed packet rate defined by a first clock frequency which corresponds to the average distance in time between two consecutive data packets transmitted onto the asynchronous packet data network, which is independent of the bitrate of the synchronous data stream.

In an embodiment, the solution may comprise reading data received at the receiver node 110 with a second clock frequency, which second clock frequency is adapted such that the amount of data stacked at the receiving node is more or less constant.

In an embodiment, the solution may comprise adding a time stamp to a portion of the data packets, or to all data packets, at the transmitter node 100. The added time stamp may indicate a clock frequency of a synchronous communication unit 150, further described below. The receiver node 110 may read the time stamps. The receiver node 110 may be reading the time stamps determine and regenerate the second clock frequency. The time stamp may be used to adjust the second clock frequency. The receiver node 110 may use the time stamp together with a determined offset.

In an embodiment, a first clock frequency may be indicated by a determined fixed time period between the start points of each asynchronous data packet.

In an embodiment, the time period may be slightly changed. If for example data packets are transmitted at 0, 10 μs, 20 μs, 30 μs, there may be changed to transmission at 41 μs, 51 μs, 61 μs and so forth. In this example illustrated a shift forward, but a shift backwards may of course also be possible. Such changes in time period may be motivated when traffic is added or removed in the network.

In an embodiment, when an above described changed of time period is performed, the change of the time period may be communicated from the transmitter node 100 to the receiver node 110. The information describing the change, may include how much the start point is dislocated and whether the dislocation is forward or backward, not limiting other information to be communicated.

An advantage with indicating the first clock frequency by the start point of each data packet is that no specific clock information may be necessary to be transmitted along with the data packets.

In an embodiment, the first clock frequency may be a reference clock frequency of the transmitter node 100.

Figure 6A:
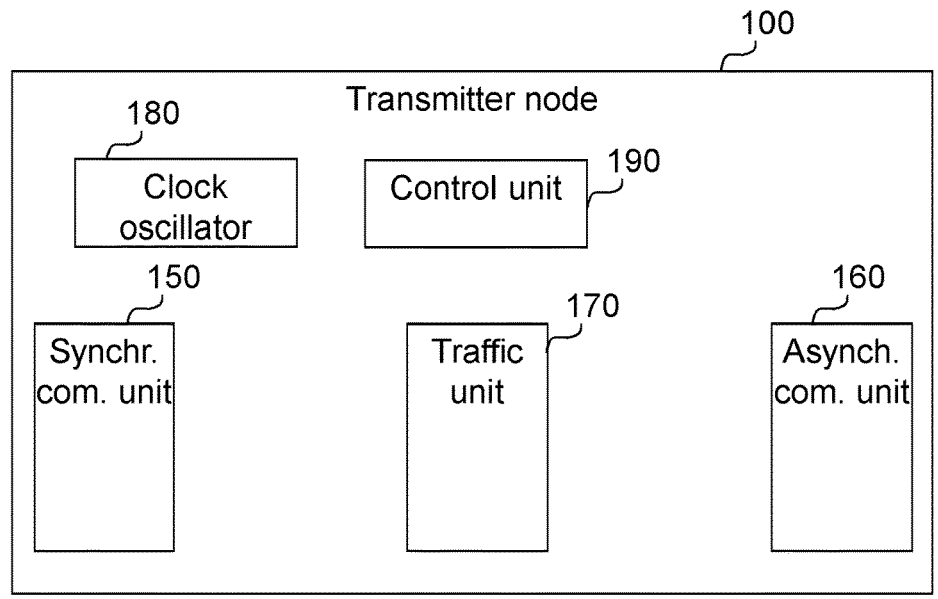
FIGS. 6A and 6B is a block diagram illustrating a transmitter and receiver node in more detail, according to further possible embodiments.

Both the transmitter node 100 and the receiver node 110 may have an internal clock, which may be used as reference clock. The reference clock may determine the clock frequency of the packet rate of packets transmitted onto the asynchronous packet data network 120. The first clock frequency may be the clock frequency of an asynchronous communications unit 160, shown in FIG. 6A. FIG. 6A will be further described below. The reference clock may also be used as reference for other clocks or clock frequencies of the transmitter node 100 and the receiver node 110.

In an embodiment, the size of the data packet payload may be varied, such that a second clock frequency of the bitrate of a synchronous communications unit 150 may be indicated. By variation of the data packet payload, different sizes of the data packet payload may be used for transmission of the second clock frequency. The second clock frequency may be the clock frequency of a synchronous communication unit 150, shown in FIG. 6A.

In an embodiment, a random offset may be added to the time period.

In a scenario with a large scale system, there may be a plurality of transmitter nodes 100. If the transmitter nodes 100 would transmit data packets concurrent, and the first clock frequency coincidence between different transmitter nodes 100, it may be challenging for a receiver node 110 handle concurrent receiving of data packets. By addition of a random offset to the time period, transmission of data packets may be distributed over time, such that if two transmitter nodes 100 may transmit data packets concurrent momentarily, the transmission of data packets will be slightly separated over time. Thereby it may be easier for a receiver node 110 to handle data packets received from a plurality of transmitter nodes 100, when the first clock frequency of transmitter nodes 100 may coincidence.

In an embodiment, the fixed time period may be controlled by a clock oscillator of type crystal oscillator, or atomic clock. The time period may be controlled by a crystal oscillator, Temperature Controlled crystal oscillator (TCXO), Oven Controlled crystal oscillator (OCXO), atomic clock, not limiting to other suitable clock oscillators. A clock oscillator may be necessary for maintenance of the clock frequency. A clock oscillator with low drift or high accuracy, such as a crystal oscillator or atomic clock, may be beneficial for the performance of the solution.

Figure 4:
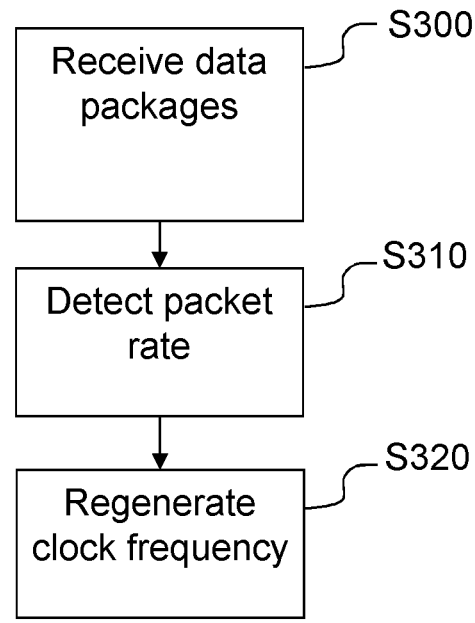
FIG. 4 is a flow chart illustrating a procedure in a receiver node, according to possible embodiments.

FIG. 4 illustrates a flowchart of an embodiment of a method performed by a receiver node 110 of a communications network 50 for reception of a synchronous data stream having a bitrate over an asynchronous packet data network 120 from a transmitting node. The method comprises receiving, in a step S300, data packets from the packet data network 120. The method comprises detecting, in a step S310, a fixed packet rate. Based on the fixed rate, in a step S320 regenerating a first clock frequency by detection of the distance in time between two consecutive data packets received from the asynchronous packet data network.

In an embodiment, the solution may comprise reading data received at the receiver node 110 with a second clock frequency, which second clock frequency is adapted such that the amount of data stacked at the receiving node is more or less constant.

In an embodiment, the solution may comprise adding a time stamp to a portion of the data packets, or to all data packets, at the transmitter node 100. The added time stamp may indicate a clock frequency of a synchronous communication unit 150, further described below. The receiver node 110 may read the time stamps. The receiver node 110 may be reading the time stamps determine and regenerate the second clock frequency. The time stamp may be used to adjust the second clock frequency. The receiver node 110 may use the time stamp together with a determined offset.

By reception of the data packets comprising synchronous data from the asynchronous packet data network 120, it may be possible to receive synchronous data via the asynchronous data network. The data packet may be received with a fixed rate. By detection of the first clock frequency, it may then be possible to regenerate the first clock frequency of the synchronous data stream.

In an embodiment, the first clock frequency of the bitrate may be determined based on the time period between a predetermined point of each asynchronous data packet. In an embodiment, the first clock frequency of the bitrate may be determined based on the time period between the start points of each asynchronous data packet. Optionally the first clock frequency of the bitrate may be determined based on the time period between the end points of each asynchronous data packet, or a combination of the start points and the end points.

In an embodiment, the first clock frequency may be a reference clock frequency of the transmitter node 100. In order to operate properly for the receiver node 110, a reference clock may be necessary. The regenerated first clock frequency may be the reference clock for the receiver node 110. The frequency of the reference clock may be the same frequency as the clock frequency of the asynchronous communications unit 140 of the receiver node 110, shown in FIG. 6B.

In an embodiment, the size of the data packets may be detected. When the size of the data packets are detected, the size of the data packets may indicate a second clock frequency of the bitrate of an individual synchronous communications unit 150. A synchronous communications unit 150 may be operating with a different clock frequency than the reference clock of the receiver node 110. By detection of the size of received data packets, it may be possible to determine the clock frequency of the synchronous communications units 150. In an embodiment, only the payload in the packet is varied, such that the total size of the data packet is similar. The size of the payload of the data packets may indicate the second clock frequency. The remaining space in each data packet would be filled with dummy data.

In an embodiment of the solution, a receiver node 110 may comprise a plurality of synchronous communications units 150. The synchronous communications units 150 may have the same synchronous bitrates of synchronous data streams. The synchronous communications units 150 may have different synchronous bitrates of the synchronous data streams. Thereby it may be possible to provide different clock frequencies of synchronous communications units 150 by usage of different data packet sizes. The clock frequencies of the synchronous communications units 150 should be independent of the reference clock of the receiver node 110, or the clock frequencies of the synchronous communications units 150 should be independent of the clock frequency of the asynchronous communication unit 160 of the receiver node 110.

In an embodiment, the size of data packets is kept similar, but the time period between each data packet is varied, where the duration of the time period between each data packet may be indicating the second clock frequency of the bitrate of an individual communications unit. An example: If synchronous data is transmitted at 600 Mbps (Megabit per second) with data packets transmitted every 10 μs. If it is desired in a muxed system to transmit data at the speed of 300 Mbps, the size of the data packet may not be changed, but instead the data packets may be transmitted every 20 μs. That would thereby fit into the packet stream which operates at 10 μs. Thereby is it enabled to combine two 300 Mbs streams in one link with a total capacity of 600 Mbs. One stream at 0, 20 μs, 40 μs, and the other stream at 10 μs, 30 μs, 50 μs etc. It may further be possible to transmit a 600 Mbps data stream at 2 μs, 12 μs, 22 μs etc. It may be advantageous to increase the time period between the data packets, instead of decreasing the size of data packets, in order to minimize overhead to the payload.

In an embodiment, the fixed time period may be controlled by a clock oscillator of type crystal oscillator, or atomic clock. A clock oscillator may be necessary for maintenance of the clock frequency in the receiver node 110. A clock oscillator with small drift or high accuracy, such as a crystal oscillator or atomic clock, may be beneficial when receiving high data rates.

In an embodiment, the time period may be determined based on data packets with a short transmission time when the transmission time vary. In an embodiment, the time period is determined based on data packets with a short transmission time in comparison with the average transmission time, when the transmission time vary. By determining the time period only based on data packets with a short transmission time, the first clock frequency of the synchronous data stream may be possible to determine with a better accuracy, compared to if all data packets are used. Individual data packet may have different transmission time between a transmitter node 100 and a receiver node 110 over an asynchronous packet data network 120. Such differences may be due to different routing paths through the network, traffic load on individual switching or routing units in the packet data network 120, or traffic congestion in the packet data network 120.

Figure 5:
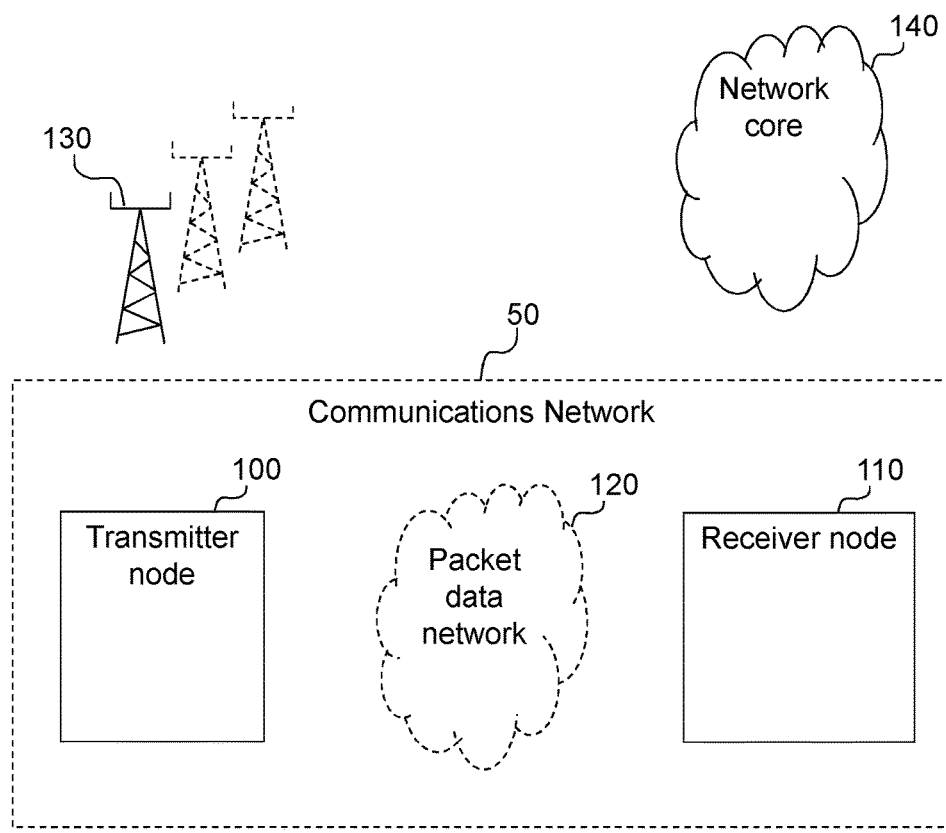
FIG. 5 is a block diagram illustrating the solution, according to further possible embodiments.

FIG. 5 illustrates an embodiment of a system in a communications network 50 for transmission of a synchronous data stream having a bitrate over an asynchronous packet data network 120 between a transmitter node 100 and a receiver node 110. The system comprises the transmitter node 100 arranged to package the synchronous data stream into data packets. The transmitter node 100 arranged to transmit the data packets onto the asynchronous packet data network 120 with a fixed packet rate defined by a first clock frequency which corresponds to the average distance in time between two consecutive data packets transmitted onto the asynchronous packet data network, which is independent of the bitrate of the synchronous data stream, The system comprises the receiver node 110 arranged to receive the data packets from the asynchronous packet data network 120. The receiver node 110 arranged to detect the fixed packet rate. The receiver node 110 arranged to based on the fixed packet rate, regenerate the first clock frequency by detection of the distance in time between two consecutive data packets received from the asynchronous packet data network, The receiver node 110 arranged to read data with a second clock frequency, which second clock frequency is adapted such that the amount of data stacked at the receiving node is more or less constant.

FIG. 5 further shows a radio base station 130 for wireless access of user equipment's (UE), to or from where the data stream may be coming and a network core 140 for further handling of the data stream to or from the UE. The figure shows the transmitter node 100 near to the base station 130 and the receiver node 110 near the network core 140. For the sake of clarity, it should be understood that data streams may go in both directions and that implies that a transmitter node 100 and a receiver node 110, such as the transmitter node 100 and the receiver node 110, may be located near the base station 130 and near the core network 140.

In an embodiment, a transmitter node 100 of a communications network 50 for transmission of a synchronous data stream having a bitrate over an asynchronous packet data network 120 to a receiver node 110 is illustrated by FIG. 6A. The transmitter node 100 is arranged to package the synchronous data stream into data packets. The transmitter node 100 is arranged to transmit the data packets onto the asynchronous packet data network 120 with a fixed packet rate defined by a first clock frequency which corresponds to the average distance in time between two consecutive data packets transmitted onto the asynchronous packet data network, which is independent of the bitrate of the synchronous data stream.

In an embodiment of the transmitter node 100, the synchronous data stream may be received by a synchronous communication unit 150. The data packets may be transmitted onto the packet data network 120 with an asynchronous communications unit 160.

In an embodiment, the transmitter node 100 may be arranged to indicate a first clock frequency by a determined fixed time period between the start points of each asynchronous data packet.

In an embodiment, the first clock frequency may be a reference clock frequency of the transmitter node 100. The first clock frequency may be the reference clock of a traffic unit 170.

In an embodiment, the size of the data packet payload may be varied, such that a second clock frequency of the bitrate of a synchronous communications unit 150 may be indicated. The second clock frequency may be the clock frequency of the synchronous communication unit 150.

In an embodiment, a random offset may be added to the time period. In an embodiment, information about the random offset is provided by the transmitter node 100 to the receiver node 110.

In an embodiment, the fixed time period may be controlled by a clock oscillator of type crystal oscillator, or atomic clock. An example of a clock oscillator is shown on the FIG. 6A by the clock oscillator 180.

Figure 6B:
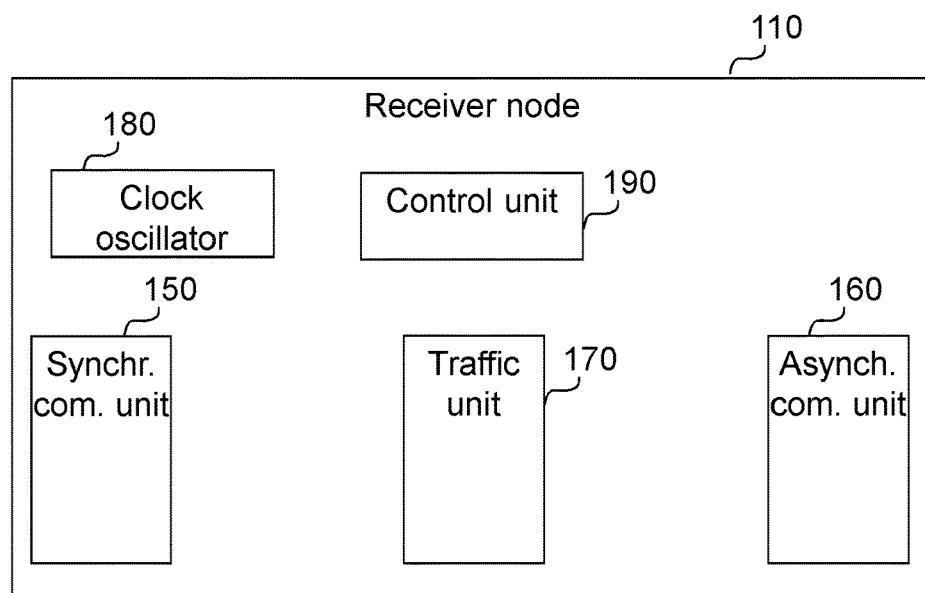

In an embodiment, a receiver node 110 of a communications network 50 for reception of a synchronous data stream having a bitrate over an asynchronous packet data network 120 from a transmitting node 100 is illustrated by FIG. 6B. The receiver node 110 is arranged to receive data packets from the packet data network 120. The receiver node 110 is arranged to detect a fixed packet rate. The receiver node 110 is, based on the fixed rate, arranged to regenerate a first clock frequency by detection of the distance in time between two consecutive data packets received from the asynchronous packet data network. The receiver node 110 is arranged to read data with a second clock frequency, which second clock frequency is adapted such that the amount of data stacked at the receiving node is more or less constant.

In an embodiment, the receiver node 110 is arranged to determine the first clock frequency of the bitrate based on the time period between a predetermined point of each asynchronous data packet.

In an embodiment of the receiver node 110 the first clock frequency may be a reference clock frequency of the transmitter node 100. The first clock frequency may be the reference clock of a traffic unit 170.

In an embodiment, the receiver node 110 may be arranged to detect a size of the data packets. The size of the data packets may indicate a second clock frequency of the bitrate of an individual communications unit, such as the synchronous communication unit 150.

In an embodiment, the fixed time period may be controlled by a clock oscillator of type crystal oscillator, or atomic clock. An example of a clock oscillator is shown on the FIG. 6B by the clock oscillator 180.

In an embodiment, the time period may be determined based on data packets with a short transmission time in comparison with the average transmission time, when the transmission time vary.

Figure 7:
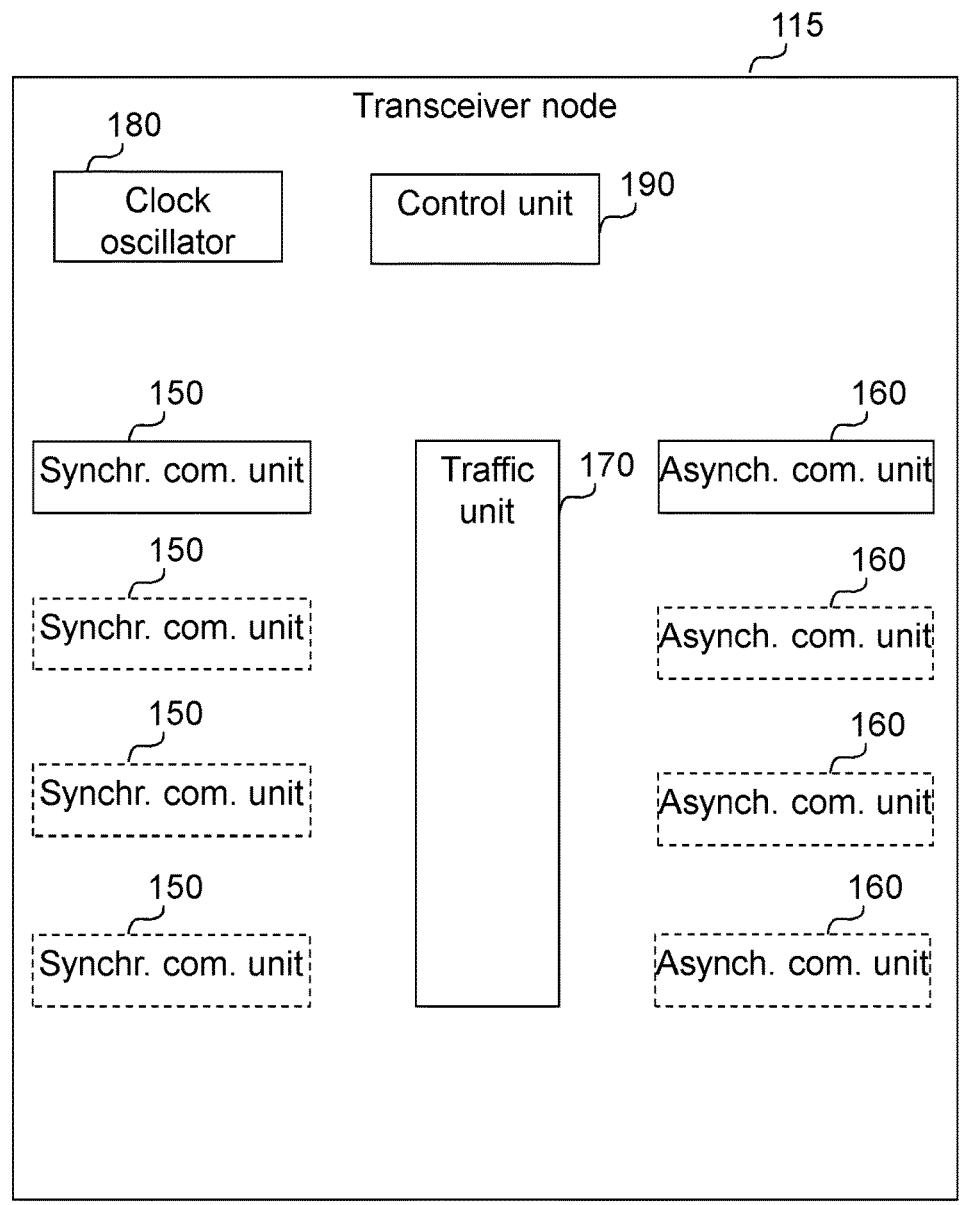
FIG. 7 is a block diagram illustrating a node, according to further possible embodiments.

FIG. 7 illustrates further embodiments of the solution. The figure illustrates a non-limiting example where a transmitter node 100 and a receiver node 110 are combined into a transceiver node 115. The transceiver node 115 may comprise a plurality of synchronous communication units 150. The transceiver node 115 may comprise a plurality of asynchronous communication units 160. A synchronous communication unit 150 may be adopted to only receive or only transmit, or both transmit and receive. An asynchronous communication unit 160 may be adopted to only receive or only transmit, or both transmit and receive.

A transmitter node 100, a receiver node 110 and a transceiver node 115, may be a single installed communications node, or the transmitter node 100, the receiver node 110 and the transceiver node 115 may be part of a larger communications node comprising a plurality of transmitter nodes 100, receiver nodes 110 and transceiver nodes 115.

In an embodiment, the traffic unit 170 may be an FPGA circuit (Field-programmable gate array). The synchronous communication unit 150 and asynchronous communication unit 160 may be arranged for wireless communication. The synchronous communication unit 150 and asynchronous communication unit 160 may be arranged for optical or electrical wired communication. The communications units 150 and 160 may be adopted for identical or similar bitrates or data streams.

In an embodiment, the synchronous communication unit 150 and the asynchronous communication unit 160 in the transmitter node 100 and/or the receiver node 110 may a contain buffer memory.

In an embodiment, the traffic unit 170 in the receiver node 110 may comprise a PLL (Phase-lock Loop). The traffic unit 170 may comprise a DLL (Delayed-locked Loop). The PLL or the DLL may be arranged for adjusting the first clock frequency.

In an embodiment, the synchronous communications unit 150 in the receiver node 110 may comprise a PLL (Phase-lock Loop). The synchronous communications unit 150 may comprise a DLL (Delayed-locked Loop). The PLL or DLL may be arranged for adjusting the second clock frequency.

Figure 8A:
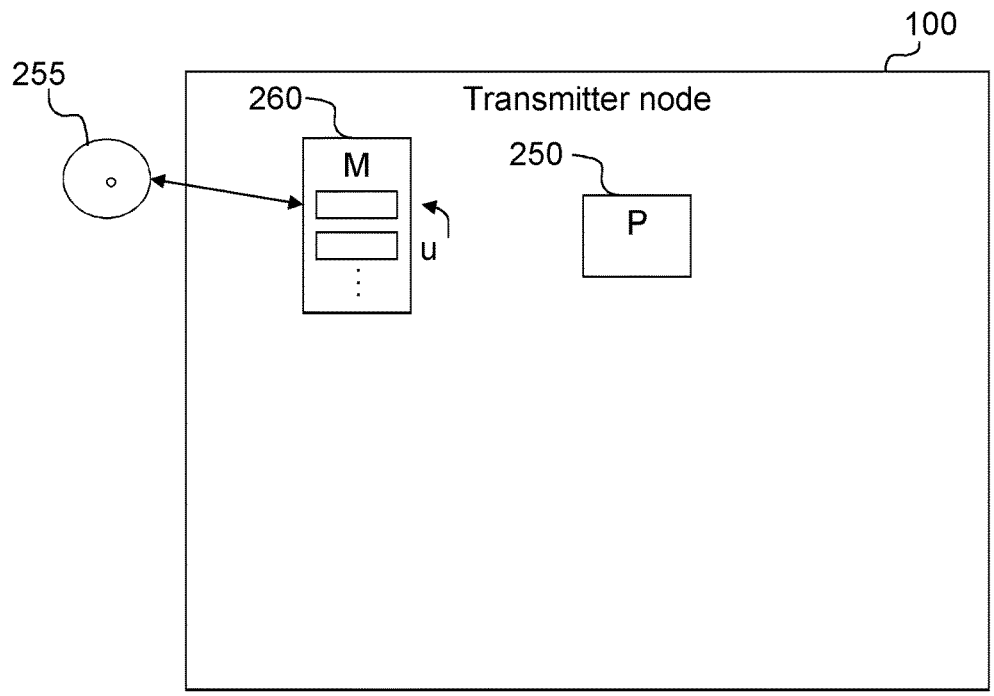
FIGS. 8A and 8B is a block diagram illustrating a transmitter and receiver node in more detail, according to further possible embodiments.
Figure 8B:
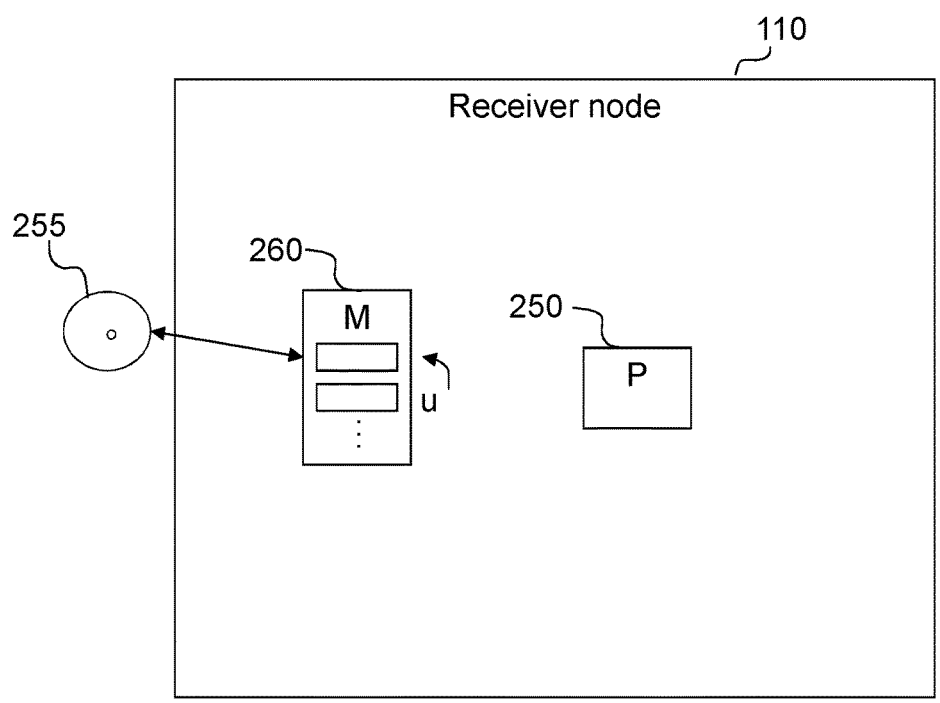

Looking at FIG. 8A and FIG. 8B, the described transmitter node 100 and the receiver node 110 described above may be implemented, by means of program units of a respective computer program comprising code means which, when run by processors "P" 250 causes the described transmitter node 100 and the receiver node 110 to perform the above-described actions. The processors P 250 may comprise a single Central Processing Unit (CPU), or could comprise two or more processing units. For example, the processors P 250 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processors P 250 may also comprise a storage for caching purposes.

Each computer program may be carried by computer program products "M" 260 in the described transmitter node 100 and the receiver node 110, in the form of memories having a computer readable medium and being connected to the processor P. The computer program products may be carried by a medium 255, such as CD, DVD, flash memory, or downloadable objects. Each computer program product M 260 or memory thus comprises a computer readable medium on which the computer program is stored e.g. in the form of computer program units "u". For example, the memories M 260 may be a flash memory, a Random-Access Memory (RAM), a Read-Only Memory (ROM) or an Electrically Erasable Programmable ROM (EEPROM), and the program unit's u could in alternative embodiments be distributed on different computer program products in the form of memories within the described transmitter node 100 and the receiver node 110.

While the solution has been described with reference to specific exemplary embodiments, the description is generally only intended to illustrate the inventive concept and should not be taken as limiting the scope of the solution. For example, the terms "receiver node", "transmitter node" and "bitrate" have been used throughout this description, although any other corresponding nodes, functions, and/or parameters could also be used having the features and characteristics described here. The solution is defined by the appended claims.

The invention claimed is:

1. Method performed by a system of a communications network for transmission of a synchronous data stream having a bitrate determined by a clock frequency, over an asynchronous packet data network between a transmitter node and a receiver node, comprising:

packaging, by the transmitter node, the synchronous data stream into data packets, wherein the size of the data packet payload is varied, such that the clock frequency of the synchronous data stream of a synchronous communications unit is indicated, transmitting, by the transmitter node, the data packets onto the asynchronous packet data network with a fixed packet rate defined by a first clock frequency which corresponds to the average distance in time between two consecutive data packets transmitted onto the asynchronous packet data network, which is independent of the bitrate of the synchronous data stream, receiving, by the receiver node, the data packets from the asynchronous packet data network, detecting, by the receiver node, the fixed packet rate, and based on the fixed packet rate, regenerating, by the receiver node, the first clock frequency by detection of a distance in time between two consecutive data packets received from the asynchronous packet data network, and reading, by the receiver node, data of the received data packets with a second clock frequency, which second clock frequency is adapted such that the amount of data stacked at the receiver node is more or less constant.

2. The method according to claim 1, comprising indicating, by the transmitter node, the first clock frequency by a determined fixed time period between a predetermined point of each asynchronous data packet.

3. The method according to claim 1, wherein the first clock frequency is a reference clock frequency of the transmitter node.

4. The method according to claim 3, wherein the time period is determined based on data packets with a short transmission time in comparison with the average transmission time, when the transmission time vary.

5. The method according to claim 1, wherein the fixed time period is controlled by a clock oscillator of type crystal oscillator, or atomic clock.

6. The method according to claim 1, comprising determining, by the receiver node, the first clock frequency based on a time period between a predetermined point of each asynchronous data packet.

7. An apparatus, comprising:

a transmitter node arranged to package a synchronous data stream having a bitrate determined by a clock frequency into data packets, wherein a size of a data packet payload of the data packets is varied, such that the clock frequency of the synchronous data stream of a synchronous communications unit is indicated, the transmitter node arranged to transmit the data packets onto an asynchronous packet data network with a fixed packet rate defined by a first clock frequency which corresponds to an average distance in time between two consecutive data packets of the data packets transmitted onto the asynchronous packet data network, which fixed packet rate is independent of the bitrate of the synchronous data stream, a receiver node arranged to receive the data packets from the asynchronous packet data network, the receiver node arranged to detect the fixed packet rate, and based on the fixed packet rate, the receiver node is arranged to regenerate the first clock frequency by detection of the distance in time between two consecutive data packets of the data packets received from the asynchronous packet data network, and wherein the receiver node is arranged to read data of the received data packets with a second clock frequency, the second clock frequency is adapted to control an amount of data stacked at the receiver node.

8. The apparatus according to claim 7, wherein the transmitter node is:

arranged to indicate the first clock frequency by a determined fixed time period between a predetermined point of each asynchronous data packet.

9. The apparatus according to claim 7, wherein the receiver node is:

arranged to determine the first clock frequency based on the time period between a predetermined point of each asynchronous data packet.

10. The apparatus according to claim 9, wherein the time period is determined based on data packets with a short transmission time in comparison with the average transmission time, when the transmission time vary.

11. A computer program product having a non-transitory computer readable medium comprising a computer program comprising computer readable code which, when run on an apparatus, causes the apparatus to behave as an apparatus according to claim 7.

* * * * *